United States Patent
Grover

(10) Patent No.: US 9,577,902 B2
(45) Date of Patent: Feb. 21, 2017

(54) METHOD AND APPARATUS FOR APPLICATION LAUNCH AND TERMINATION

(71) Applicant: Ford Global Technologies, LLC, Dearborn, MI (US)

(72) Inventor: Joey Ray Grover, Madison Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 416 days.

(21) Appl. No.: 14/148,154

(22) Filed: Jan. 6, 2014

(65) Prior Publication Data

US 2015/0195163 A1 Jul. 9, 2015

(51) Int. Cl.
*G06F 3/048* (2013.01)
*H04L 12/26* (2006.01)
*G06F 3/0488* (2013.01)

(52) U.S. Cl.
CPC .......... *H04L 43/08* (2013.01); *G06F 3/04883* (2013.01); *B60K 2350/10* (2013.01)

(58) Field of Classification Search
CPC ........ G06F 3/00; G06F 3/04883; H06F 43/08; B60K 2350/10
USPC ........................................................ 715/736
See application file for complete search history.

(56) References Cited

U.S. PATENT DOCUMENTS

| | | | |
|---|---|---|---|
| 7,840,912 B2 | 11/2010 | Elias et al. | |
| 8,136,053 B1 | 3/2012 | Miller et al. | |
| 8,527,900 B2* | 9/2013 | Mueller | B60K 37/06 715/784 |
| 9,060,072 B2* | 6/2015 | Hynes | H04M 1/72577 |
| 9,376,018 B2* | 6/2016 | Aryal | B60K 35/00 |
| 2006/0026521 A1* | 2/2006 | Hotelling | G06F 3/0418 715/702 |
| 2009/0085880 A1* | 4/2009 | Vitale | B60R 11/0264 345/173 |
| 2010/0031203 A1 | 2/2010 | Morris et al. | |
| 2011/0028139 A1* | 2/2011 | Odom | H04M 1/72569 455/418 |
| 2013/0293452 A1 | 11/2013 | Ricci et al. | |

\* cited by examiner

*Primary Examiner* — David Phantana Angkool
(74) *Attorney, Agent, or Firm* — Jennifer Stec; Brooks Kushman P.C.

(57) ABSTRACT

A system includes a processor configured to receive a first input corresponding to an application launch command. The processor is also configured to launch a selected application based on the first input. Further, the processor is configured to monitor for a second input, different from the first input, corresponding to an application kill command, while the selected application is executing and, upon receipt of the second input, terminate the application.

19 Claims, 4 Drawing Sheets

METHOD AND APPARATUS FOR APPLICATION LAUNCH AND TERMINATION

TECHNICAL FIELD

The illustrative embodiments generally relate to a method and apparatus for application launch and termination.

BACKGROUND

Vehicle computing systems provide the opportunity for users to experience a variety of applications being run in a vehicle environment. Like many systems, these computing systems are subject to the occasional hang-ups or errors. Typically, at least as a last resort, a user of a personal computer or smart phone can simply turn off or unplug the device in order to cease operation of an error-prone or error-causing application. But, when driving down the highway at 70 miles per hour, this may not be an option.

SUMMARY

In a first illustrative embodiment, a system includes a processor configured to receive a first input corresponding to an application launch command. The processor is also configured to launch a selected application based on the first input. Further, the processor is configured to monitor for a second input, different from the first input, corresponding to an application kill command, while the selected application is executing and, upon receipt of the second input, terminate the application.

In a second illustrative embodiment, a computer-implemented method includes receiving a first input corresponding to an application launch command. The method also includes launching a selected application based on the first input. Further, the method includes monitoring for a second input, different from the first input, corresponding to an application kill command, while the selected application is executing. The method also includes terminating the application, upon receipt of the second input.

In a third illustrative embodiment, a non-transitory computer-readable storage medium stores instructions that, when executed, cause a processor to perform a method that includes receiving a first input corresponding to an application launch command. The method also includes launching a selected application based on the first input. Further, the method includes monitoring for a second input, different from the first input, corresponding to an application kill command, while the selected application is executing. The method also includes terminating the application, upon receipt of the second input.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
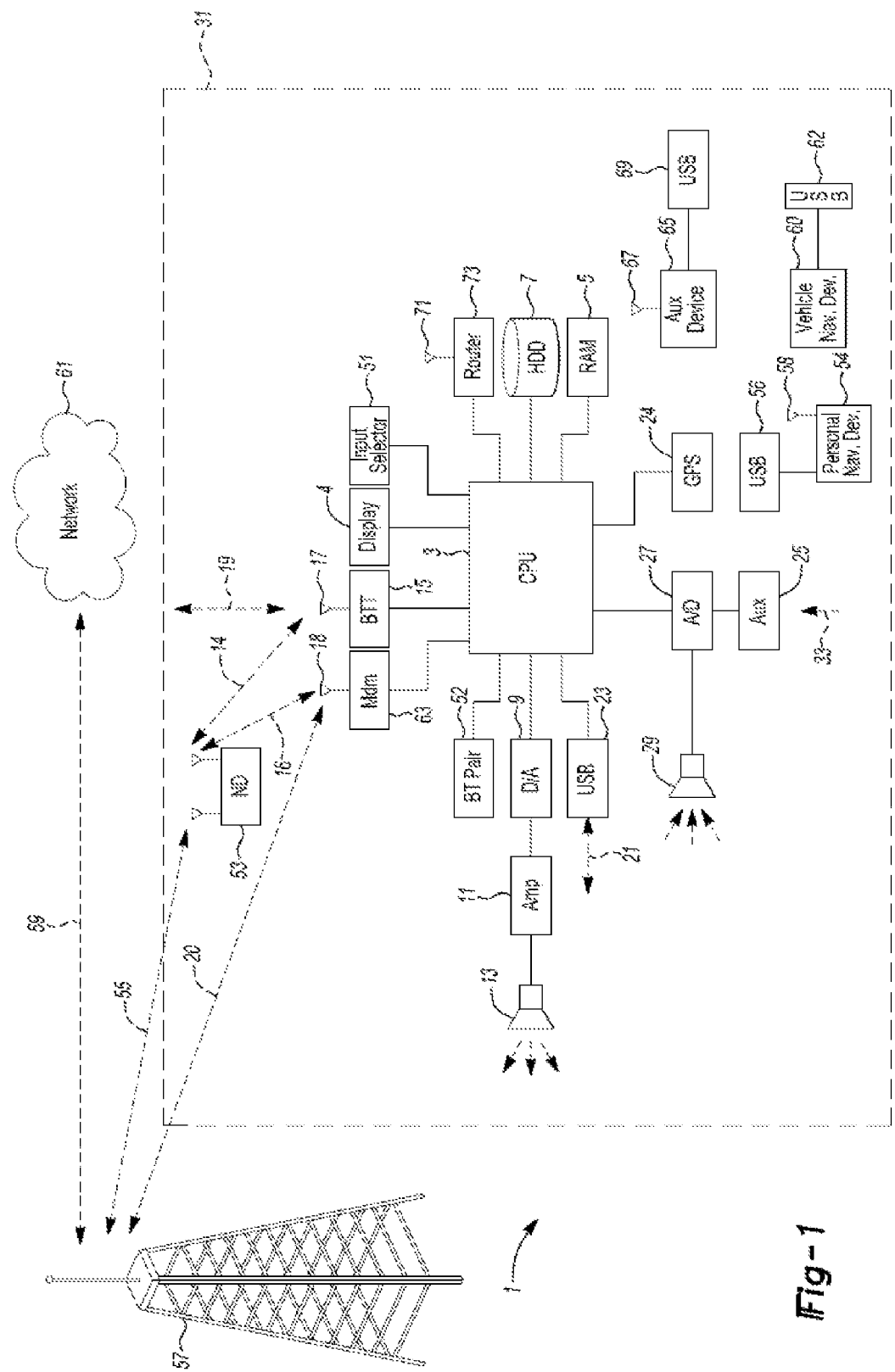
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users.

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
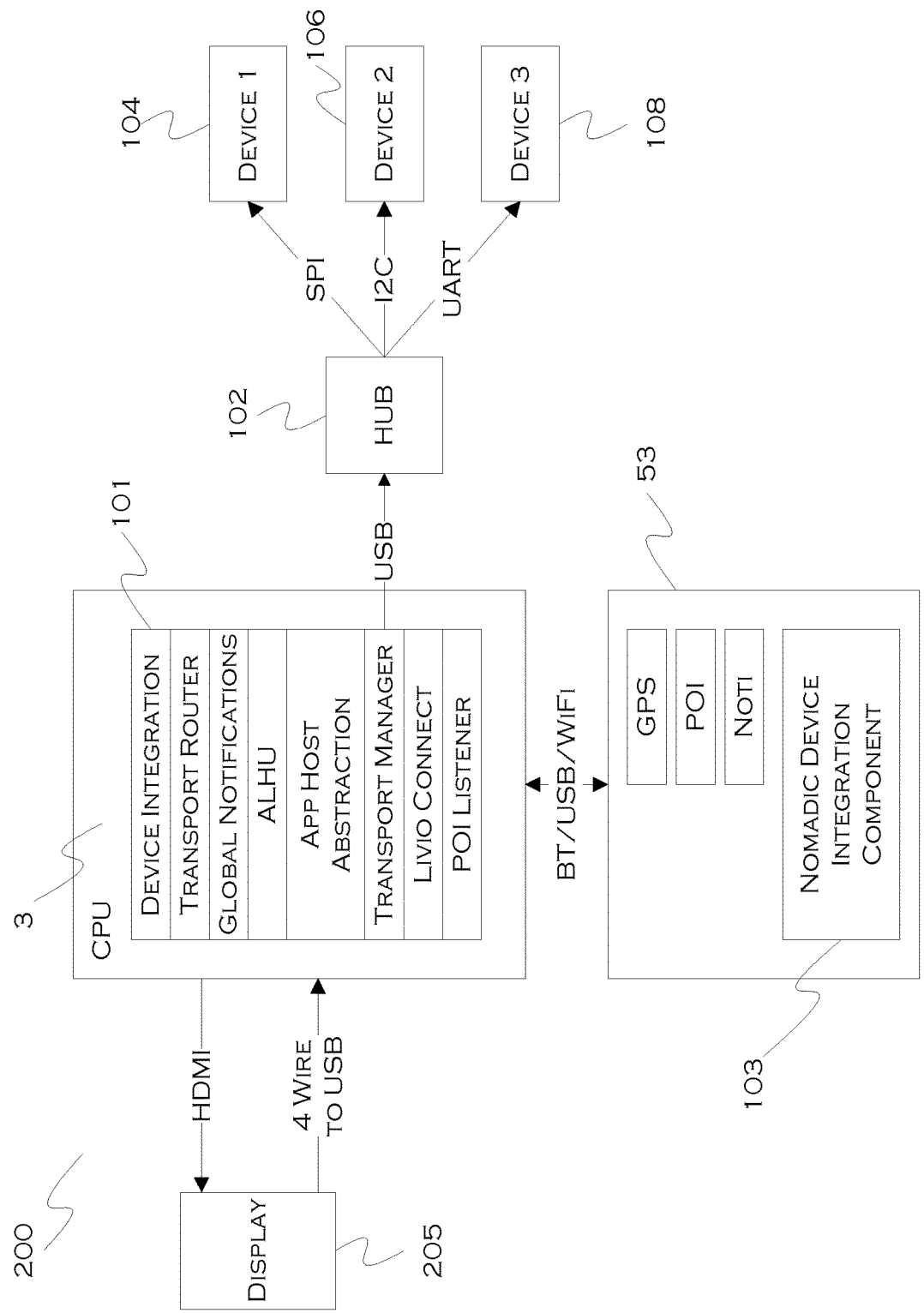
FIG. 2 shows an exemplary block topology of a system for integrating one or more connected devices with the vehicle based computing system according to an embodiment.

FIG. 2 is an exemplary block topology of a system 200 for integrating one or more connected devices with the vehicle based computing system 1 (VCS). The CPU 3 may be in communication with one or more transceivers. The one or more transceivers are capable for wired and wireless communication for the integration of one or more devices. To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 to take advantage of the services provided by the device integration framework 101.

The one or more transceivers may include a multiport connector hub 102. The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108.

In the illustrative embodiments, a vehicle head unit may have a "home screen" displaying one or more executable applications. Typically, these applications can be launched through the use of a gesture (e.g., a press) or a voice command. Input of the gesture, for example, could cause the launch of a designated application. For example, a short press of an application icon could launch that application. If the application is not currently running, the only available gesture may relate to application enablement.

Once the application is running, it has the possibility to cause hang-ups or errors. If the user determines that an application is causing a problem or otherwise not operating correctly, the user has the option to kill the application by powering down the vehicle and opening a driver door to reset the system. But, if the driver is engaged in driving, this may not be an option. Thus, according to the illustrative embodiments, a second gesture may be defined to kill the application. For example, a long press, or a double press, could be defined. Once input, this could automatically kill the offending application, avoiding the need for stopping the vehicle and performing a "hard restart."

In some instances, the vehicle computer may provide a confirmation option before killing the application. In other cases, the process may simply proceed to kill the application upon receipt of the termination command. Different models could be implemented based on driving states, for example, if a vehicle is moving or moving over a certain speed, the process could automatically terminate the application. On the other hand, if the vehicle is stopped or moving slowly, the process could provide a confirmation request.

The illustrative processes, and similar processes, can be implemented as an individual application, as part of a vehicle computing operating system, as part of the applications themselves or in any other suitable manner.

Figure 3:
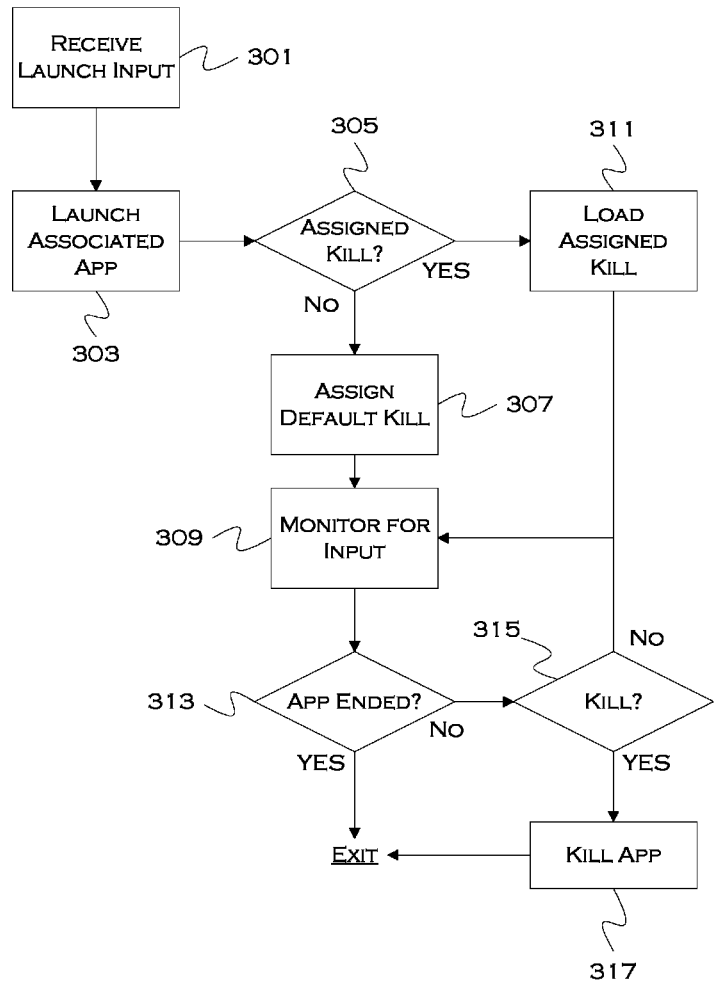
FIG. 3 shows an illustrative process for application launching.

FIG. 3 shows an illustrative process for application launching. In this illustrative example, a gesture for launching an application has already been defined. This gesture may vary from application to application, or application-type to application-type. In other examples, all applications may use the same launch and/or kill gesture. The gestures may be user defined and/or they may be factory preset.

In this example, the process first receives an input associated with launching an application 301. In this case, for this example, a short-press will designate a launch command (e.g., a press of less than two seconds). Once the short-press has been received, the process will launch the selected application 303. In this example, the user has implemented the short-press by pressing the icon corresponding to the application for less than two seconds on a vehicle display.

Once the application has been launched, the process checks to see if there is any kill gesture associated with an application 305. As previously noted, the process may have differing gestures associated with varied applications, or a universal launch and/or kill gesture may be used. If there is a pre-assigned kill gesture associated with the application, the process may load the kill gesture into memory for recognition 311.

If there is no kill gesture assigned, the process may assign a default or universal kill gesture 307. This gesture could be pre-defined by a manufacturer, or have been previously defined by a user. Once the kill gesture has been loaded or assigned, the process may monitor for input of the kill gesture 309. As long as the application has not ended 313, the process will check for input of the kill gesture 315. If a recognized kill gesture is input, the process will kill the application 317. Otherwise, the process will continue to monitor for kill gestures until the application terminates.

Figure 4:
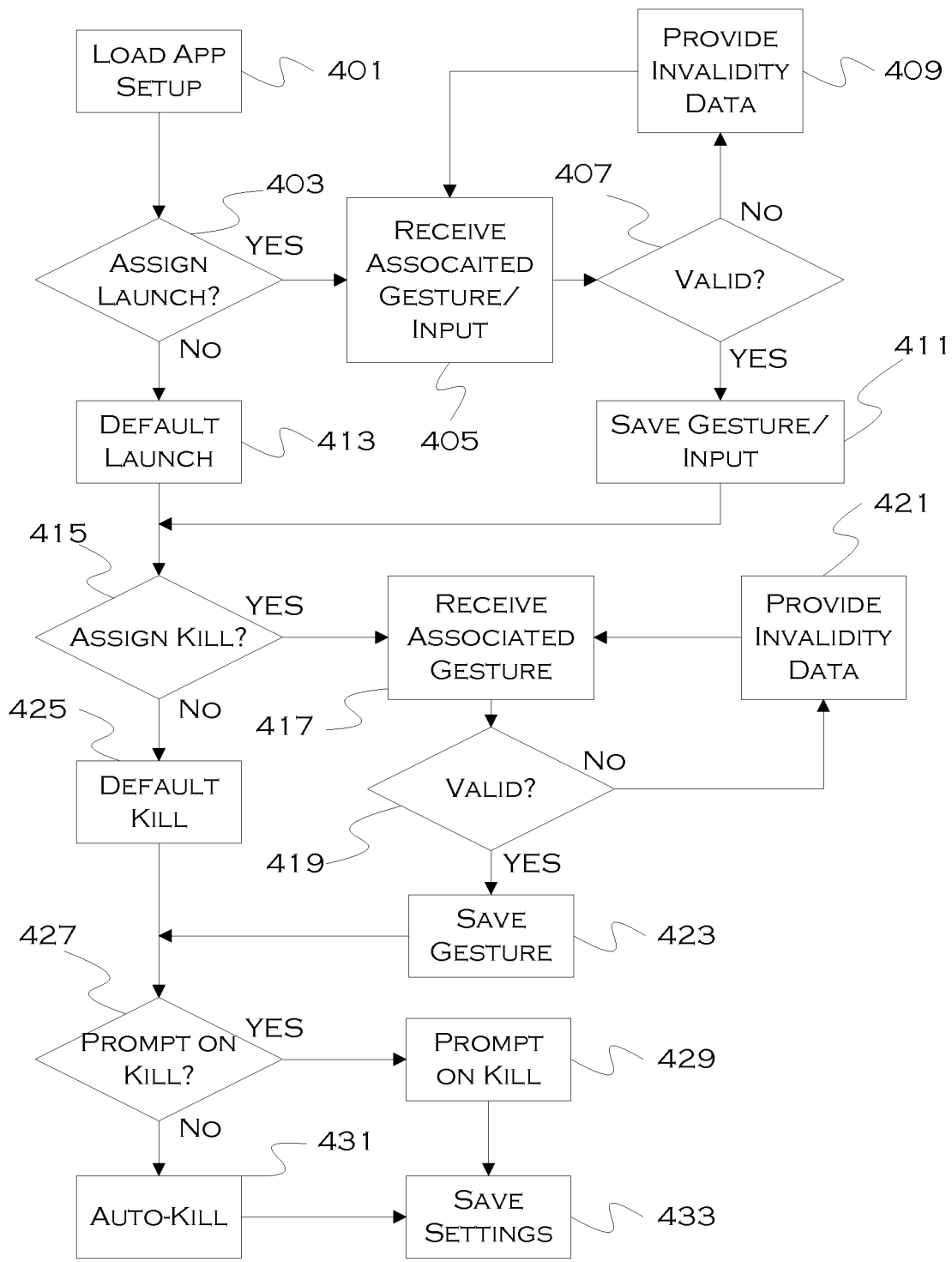
FIG. 4 shows an illustrative process for gesture designation.

FIG. 4 shows an illustrative process for gesture designation. In this illustrative embodiment, the process will load a setup application, designed to receive input gesture setup 401. If the user desires, they can assign a generic launch gesture 403. In some instances, if a varied gesture is desired for different applications, the user can also select an application for which to assign the gesture.

If the user wishes to designate a kill gesture, the process will receive the input from the user that is desired for the kill gesture 405. This can be any recognizable input that can be detected by a vehicle system. Typically, although not necessarily, this will be recognized by the touch-display. But, for example, if a vehicle is outfitted with a camera, certain signal gestures could be designated for certain applications. For example, without limitation, holding an invisible phone to the ear could be set as a phone initiation gesture. This gesture could be specific to that particular application.

Whatever gesture is being set, if the process validates the gesture 407, the process will save the gesture/input with respect to all applications or a designated application or application type 411.

In some cases the gesture may be invalid, for example, if it conflicts with another pre-designated input type, or for any other suitable reason. If the gesture is invalid, the process may notify the user that the gesture is invalid, along with any reasonable explanation 409. If no gesture is assigned for launch, the process may utilize a factory default launch, or other previously set launch gesture/input 413.

In a similar manner, kill gestures or inputs may be assigned 415. Once again, a kill gesture/input may be received 417 and validated 419. For example, if a longer press is designated as a kill gesture, the process may have to ensure that the long press is long enough that it is easily distinguishable from the short press. Double presses must be distinguishable from a short press, etc.

Once the new gesture has been validated, the process can save the gesture/input 423. If the gesture/input is invalid, the process may again provide the invalidity data 421. If no kill gesture is designated, the process may utilize a default or previously assigned kill gesture 425.

The user can also designate prompt-on-kill setup in this menu 427. In this example, the process may allow a user to designate a particular application, application type, or all applications as prompt-on-kill applications 429. Or, the user may utilize auto-kill for an application, application type, or all applications 431. Auto-kill, in this example, means that the system kills the application upon kill gesture receipt without first prompting the user.

Although not shown, the user may also designate scenario based prompts (e.g., without limitation, if below 20 mph then prompt, else auto-kill). In some instances, auto-kill may be automatic, so that a user is not distracted by a prompt when at high speeds or in distracting situations. In other cases, the user may set specific scenarios for each application or all applications as to when to prompt and when to auto-kill. Once the appropriate designations have been made, the user-defined configuration is saved 433.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive a first touch-input having a first characteristic predefined as corresponding to an application launch command;
launch a selected application based on the first touch-input;
receieve a second touch-input, having a second characteristic different from the first characteristic and predefined as corresponding to an application kill command; and
responsive to the second input, terminate application execution.

2. The system of claim 1, wherein the first and second inputs are made to a touch-screen in a vehicle.

3. The system of claim 1, wherein the processor is further configured to confirm the termination of the application execution prior to termination.

4. The system of claim 3, wherein the processor skips confirmation if a vehicle is traveling above a predetermined speed.

5. The system of claim 3, wherein the processor skips confirmation if a measured driver distraction level is above a predetermined level.

6. The system of claim 1, wherein the processor is configured to associate varied first and second input characteristics with different applications.

7. The system of claim 1, wherein at least one of the first or second input characteristics is user defined.

8. A computer-implemented method comprising:
detecting a first motion gesture predefined as corresponding to an application launch command, using a vehicle camera;
launching a selected application based on the first motion gesture;
monitoring for a second motion gesture with the vehicle camera, the second motion gesture different from the first motion gesture and predefined as corresponding to an application kill command; and
upon detection of the second motion gesture, terminating application execution.

9. The method of claim 8, further comprising confirming termination of the application prior to terminating the application.

10. The method of claim 9, further comprising skipping confirmation if a vehicle is traveling above a predetermined speed.

11. The method of claim 9, further comprising skipping confirmation if a measured driver distraction level is above a predetermined level.

12. The method of claim 8, further comprising associating varied first and second motion gestures with different applications.

13. The method of claim 8, wherein either one of the first or second motion gestures is user defined.

14. A non-transitory computer-readable storage medium, storing instructions that, when executed, cause a processor to perform a method comprising:
receiving a first touch selection of an application icon, having a first characteristic predefined as corresponding to an application launch command;
launching an application corresponding to the icon based on the first touch selection;
receiving a second touch selection of the application icon, having a second characteristic different from the first characteristic and predefined as corresponding to an application kill command; and
upon receipt of the second touch selection, terminating application execution.

15. The storage medium of claim 14, wherein the first and second touch selections are made to a touch-screen in a vehicle.

16. The storage medium of claim 14, wherein the method further comprises confirming termination of the application prior to terminating the application.

17. The storage medium of claim 16, wherein the method further comprises skipping confirmation if a vehicle is traveling above a predetermined speed.

18. The storage medium of claim 16, wherein the method further comprises skipping confirmation if a measured driver distraction level is above a predetermined level.

19. The storage medium of claim 14, wherein the method further comprises associating varied first and second input characteristics with different applications.

* * * * *